(12) United States Patent
Sunde et al.

(10) Patent No.: US 8,655,774 B2
(45) Date of Patent: Feb. 18, 2014

(54) RETAILER DEBIT CARD SYSTEM

(71) Applicant: Target Brands, Inc., Minneapolis, MN (US)

(72) Inventors: Catherine Michelle Sunde, Richfield, MN (US); Michele Lynn Gaida, Blaine, MN (US); Timothy Michael Bardell, St. Louis Park, MN (US); Robert Joseph Meissner, Brooklyn Park, MN (US); Brent Allan Pier, Minneapolis, MN (US); Brian James Short-Ohana, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 13/861,928

(22) Filed: Apr. 12, 2013

(65) Prior Publication Data

US 2013/0232004 A1 Sep. 5, 2013

Related U.S. Application Data

(63) Continuation of application No. 13/370,953, filed on Feb. 10, 2012, now Pat. No. 8,423,455, which is a continuation of application No. 12/501,930, filed on Jul. 13, 2009, now Pat. No. 8,117,118, which is a continuation of application No. 11/674,811, filed on Feb. 14, 2007, now Pat. No. 7,562,048.

(51) Int. Cl.
*G06Q 40/00* (2012.01)

(52) U.S. Cl.
USPC .......................................................... 705/38

(58) Field of Classification Search
USPC .......................................................... 705/38
See application file for complete search history.

(56) References Cited

U.S. PATENT DOCUMENTS

| | | | |
|---|---|---|---|
| 5,621,812 A | 4/1997 | Deaton et al. |
| 5,747,784 A | 5/1998 | Walter et al. |
| 6,003,014 A | 12/1999 | Lee et al. |
| 6,129,274 A | 10/2000 | Suzuki |
| 6,292,786 B1 | 9/2001 | Deaton et al. |
| 6,330,548 B1 | 12/2001 | Walker et al. |
| 6,334,108 B1 | 12/2001 | Deaton et al. |
| 6,351,735 B1 | 2/2002 | Deaton et al. |
| 6,611,816 B2 | 8/2003 | Lebda et al. |
| 6,877,656 B1 | 4/2005 | Jaros et al. |
| 7,104,443 B1 | 9/2006 | Paul et al. |

(Continued)

OTHER PUBLICATIONS

"Blue Martini Messages @ POS," http://bluemartini.com, Blue Martini Software, Inc., 2003 (2 pages).

*Primary Examiner* — Lindsay M. Maguire
(74) *Attorney, Agent, or Firm* — Griffiths & Seaton PLLC; JoAnn M. Seaton

(57) ABSTRACT

A method of processing a purchase transaction for one or more items includes receiving, at a central computing network, MICR information associated with a financial account of a customer. The central computing network includes a solicitation processor and a comprehensive negative check file. The method further includes using the solicitation processor to determine whether to solicit the customer to apply for a financial transaction card including determining if any of a plurality of predefined reasons exist not to solicit the customer, wherein one of the plurality of predefined reasons includes if the MICR information associated with the financial account of the customer matches MICR information of a check listed in the comprehensive negative check file, if any of the plurality of predefined reasons exist, deciding not to solicit the customer, and if none of the plurality of predefined reasons exist, deciding to solicit the customer.

20 Claims, 7 Drawing Sheets

(56) References Cited

U.S. PATENT DOCUMENTS

| | | |
|---|---|---|
| RE40,220 E | 4/2008 | Nichols et al. |
| 7,401,731 B1 | 7/2008 | Pletz et al. |
| 2002/0120846 A1 | 8/2002 | Stewart et al. |
| 2003/0041021 A1 | 2/2003 | Kogler et al. |
| 2003/0055730 A1 | 3/2003 | Tokorotani |
| 2003/0078877 A1 | 4/2003 | Beirne et al. |
| 2003/0088462 A1 | 5/2003 | Carrithers et al. |
| 2003/0182247 A1 | 9/2003 | Mobed et al. |
| 2003/0208439 A1 | 11/2003 | Rast |
| 2003/0212595 A1 | 11/2003 | Antonucci |
| 2003/0229532 A1 | 12/2003 | Bass et al. |
| 2004/0117300 A1 | 6/2004 | Jones et al. |
| 2004/0230527 A1 | 11/2004 | Hansen et al. |
| 2004/0249703 A1 | 12/2004 | Weiszfeiler |
| 2005/0125336 A1 | 6/2005 | Rosenblatt et al. |
| 2005/0234817 A1 | 10/2005 | VanFleet et al. |
| 2005/0234822 A1 | 10/2005 | VanFleet et al. |
| 2005/0234833 A1 | 10/2005 | VanFleet et al. |
| 2006/0015428 A1 | 1/2006 | Friedman |
| 2006/0273152 A1 | 12/2006 | Fields |
| 2008/0255986 A1 | 10/2008 | Scarborough et al. |

RETAILER DEBIT CARD SYSTEM

CROSS-REFERENCE TO RELATED APPLICATION

The present application is a continuation of U.S. application Ser. No. 13/370,953, filed Feb. 10, 2012, which is a continuation of U.S. application Ser. No. 12/501,930, filed Jul. 13, 2009, now U.S. Pat. No. 8,117,118, issued Feb. 14, 2012, which is a continuation of U.S. application Ser. No. 11/674,811, filed Feb. 14, 2007, now U.S. Pat. No. 7,562,048, issued Jul. 14, 2009, all of which are incorporated herein by reference.

BACKGROUND OF THE INVENTION

To attract and maintain customers in today's ever more competitive retail industry, it is important to provide customers with a variety of payment options. One payment option is a merchant or retailer issued private label debit card. While private label debit cards are generally used to pay only the issuing retailer and its affiliates or networks, purchases often qualify for incentives such as discounts and rewards programs, for example. Private label debit cards are also beneficial to retailers as transaction costs are generally less than those of credit card purchases, and transactional information about customers can be readily obtained, especially as compared to cash purchases. Transactional information can be used to develop strategies for attracting new customers and for determining transactional patterns of existing customers.

In light of the above, it is beneficial to retailers for customers to utilize private label debit cards. However, for purposes of efficiency and customer satisfaction, it would be beneficial for retailers to solicit for debit cards only those customers likely to use such debit cards, and also to limit risks to the retailer.

SUMMARY OF THE INVENTION

One aspect of the present invention relates to a method of processing a purchase transaction for one or more items. The method includes receiving, at a central computing network, magnetic ink character recognition (MICR) information associated with a financial account of a customer. The central computing network includes a solicitation processor and a comprehensive negative check file, the comprehensive negative check file is maintained by a retail corporation and comprises an internal negative check file and an external negative check file, the internal negative check file includes at least a list of outstanding checks to the retail corporation that are unpaid due to non-sufficient funds, and the external negative check file includes a copy of a file compiled by a third party check authorization service. The method further includes using the solicitation processor of the central computing network to determine whether to solicit the customer to apply for a financial transaction card. Using the solicitation processor includes determining if any of a plurality of predefined reasons exist not to solicit the customer to apply for the financial transaction card, wherein one of the plurality of predefined reasons includes if the MICR information associated with a financial account of the customer matches MICR information of a check listed in the comprehensive negative check file, if any of the plurality of predefined reasons exist, deciding not to solicit the customer to apply for the financial transaction card, and if none of the plurality of predefined reasons exist, deciding to solicit the customer to apply for the financial transaction card.

The above aspects of the present invention are given only by way of illustrative example and are not to be taken in a limiting sense. Such aspects may be exemplary of one or more embodiments of the invention, and other desirable aspects and advantages inherently achieved by the invention disclosed herein may occur or become apparent to those skilled in the art. It is intended that the scope of the invention be defined by the appended claims and the equivalents thereof.

BRIEF DESCRIPTION OF THE DRAWINGS

Embodiments of the invention will be described with respect to the figures, in which like reference numerals denote like elements, and in which.

DETAILED DESCRIPTION

Figure 1:
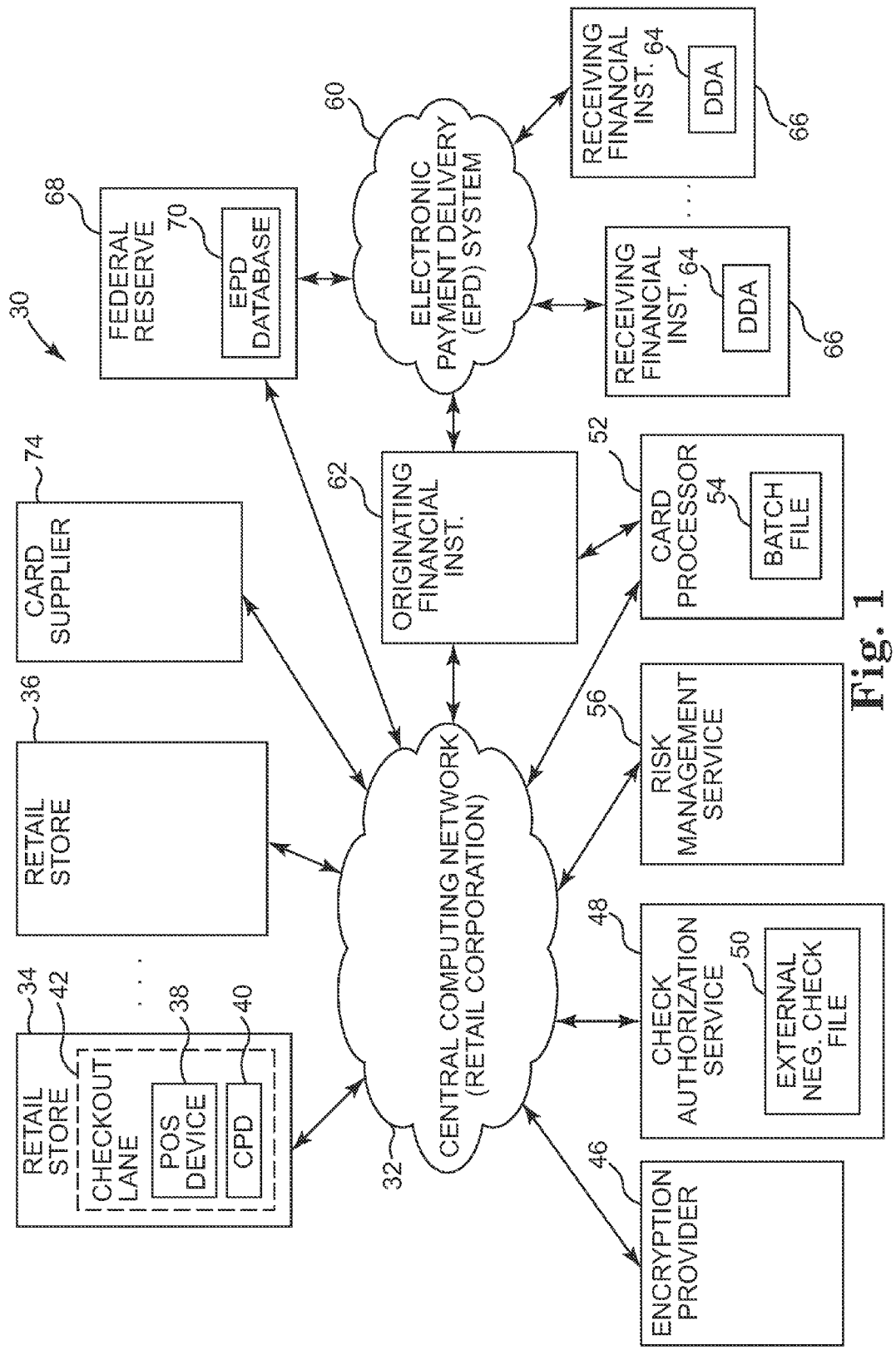
FIG. 1 is a block diagram illustrating generally one embodiment of a retail system for supporting a retailer debit card system according to the present invention.

FIG. 1 illustrates generally one embodiment of a retail system 30 for supporting a private label debit (PLD) card system according to the present invention. In one embodiment, retail system 30 is utilized by a retail corporation issuing its own PLD card which can be used by customers only for purchases from the retail corporation and its affiliates or networks. In other embodiments, the PLD card may be issued by a financial institution (e.g. a bank) affiliated with the retail corporation based on customer information associated with the retail corporation, as will be described in greater detail herein. It is noted that the terms "retail corporation" and "retailer", as used herein, entail the retail corporation and/or its affiliates or networks.

In one embodiment, with respect to FIG. 1, the retail corporation includes a central computing network 32 and multiple retail stores, including retail stores 34 and 36. Each retail store includes at least one checkout lane, with each checkout lane having a point-of-sale (POS) device, such as a cashier's register, and a customer payment device (CPD), such as POS device 38 and CPD 40 of checkout lane 42 of retail store 34. In one embodiment, CPD 40 comprises a conventional payment terminal configured to access information on the PLD card, such as by means of a magnetic reader for reading a magnetic strip on the PLD card, and including a keyboard for entering a personal identification (PIN) number associated with each PLD card and making cardholder selections, and a display screen for displaying various messages.

System 30 further includes a third party encryption provider 46 which, as will be described further below, performs a PIN translation routine during transactions and other processes which comply with the standardized Payment Card Industry (PCI) PIN encryption requirements. A third party check authorization service is indicated at 48. Check authorization service 48 maintains an external database or "negative check file" 50 comprising a comprehensive list of currently "bad" or outstanding checks which have not been paid due to non-sufficient funds (NSF) and a list of demand deposit accounts (DDAs) which are closed or are known to be fraudulent. Database 50 is updated on an on-going basis from data provided by retailers using the service. In one embodiment, system 30 may utilize more than one check authorization provider 48.

A third party card processor is illustrated at 52 and provides services such as card authorization, transaction and payment processing, account management, including certain rebate and reward programs offered by the retail corporation, and transaction settlement for PLD card transactions, to name several examples. In one embodiment, third party card processor 52 compiles a daily batch transaction file 54 of all PLD card transactions in a given 24-hour time period. A risk management service is illustrated at 56 and provides access to a range of information to locate and verify information on people, such as those applying for the PLD card, which will be described in greater detail below.

An electronic payment-delivery (EPD) system is illustrated at 60. An example of one such EDP system known to those of skill in the art is the Automated Clearing House (ACH) system. Briefly, the ACH system comprises a network that provides batch-oriented electronic funds transfer governed by the National Automated Clearing House Association (NACHA) operating rules. In short, the EPD system acts as an interface between originating and receiving depository financial institutions. In one embodiment, a third party financial institution serves as the originating financial institution 62 for the retail corporation issuing the PLD cards and submits batch transaction file 54 to EPD system 60 to execute withdrawals from the appropriate cardholders' DDAs 64 (e.g., checking accounts) maintained at receiving financial institutions 66. The Federal Reserve System 68 maintains an up-to-date database 70 of financial institutions registered with the EPD system, such as originating and receiving financial institutions 62 and 66, with database 70 including a list of routing numbers of all registered financial institutions.

In one embodiment, as illustrated, a card supplier 74 is utilized to prepare PLD cards based on cardholder information obtained as part of an enrollment process, which is described in greater detail below. In one embodiment, card supplier 74 is a third party financial institution. In one embodiment, card supplier 74 is a financial institution affiliated with the retail corporation.

Communications between the retail corporation's central computing network 32 and individual elements of system 30, and between individual elements of system 30, may take place via the Internet or other communication means, such as by direct connection (e.g. a direct links between central computing network 32 and third party card processor 52, between central computing network 32 and originating financial institution 62, and between EPD system 60 and originating and receiving financial institutions 62, 66).

Figure 2:
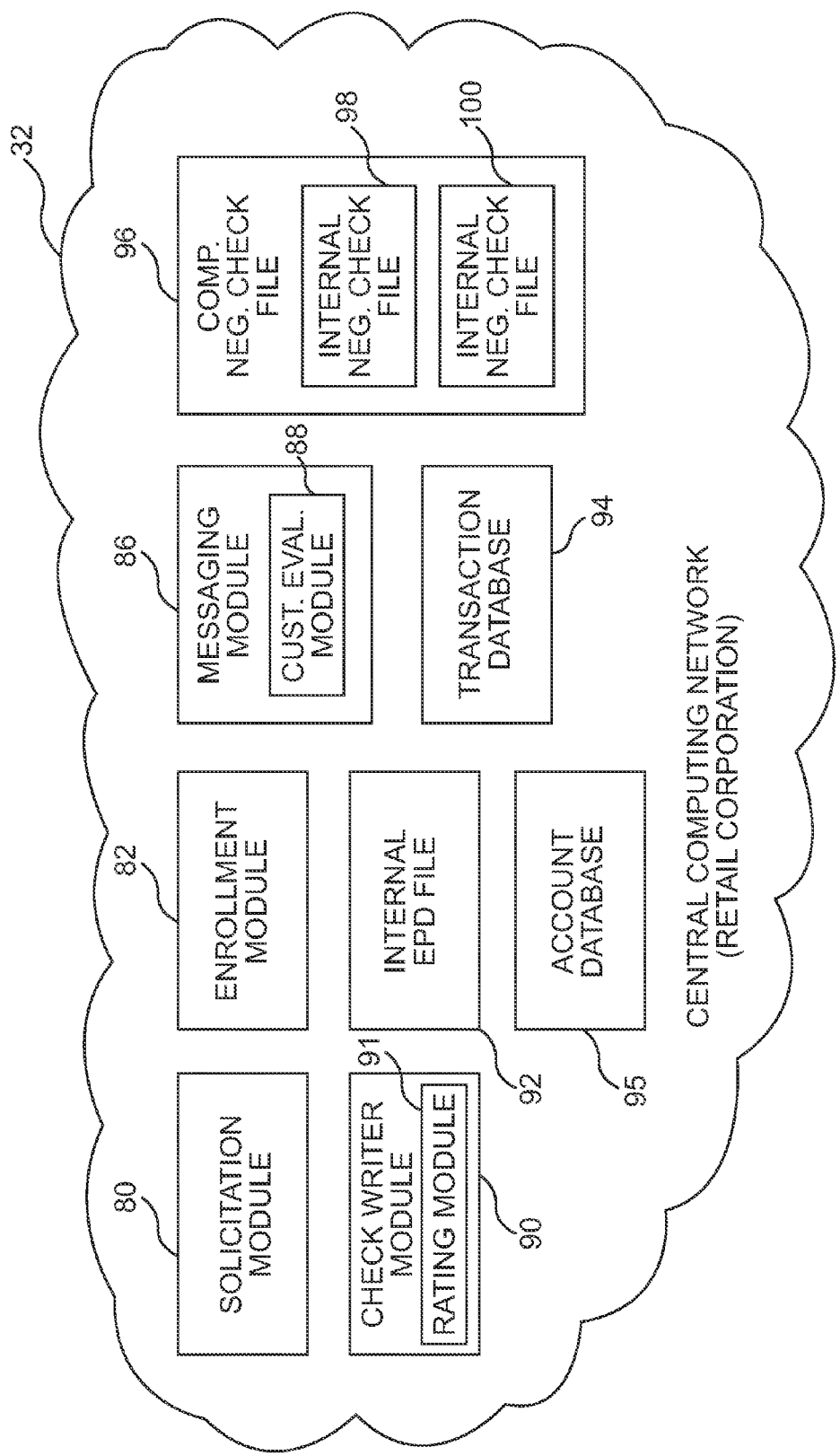
FIG. 2 is a block diagram illustrating generally one embodiment of the central computing network of FIG. 1.

FIG. 2 is a block diagram generally illustrating one embodiment of central computing network 32 of FIG. 1. Central computing network 32 includes a solicitation module 80, an enrollment module 82, a messaging module 86, a check writer module 90, an internal EPD file 92, a transaction database 94, an account database 95, and a comprehensive negative check file 96.

Figure 5:
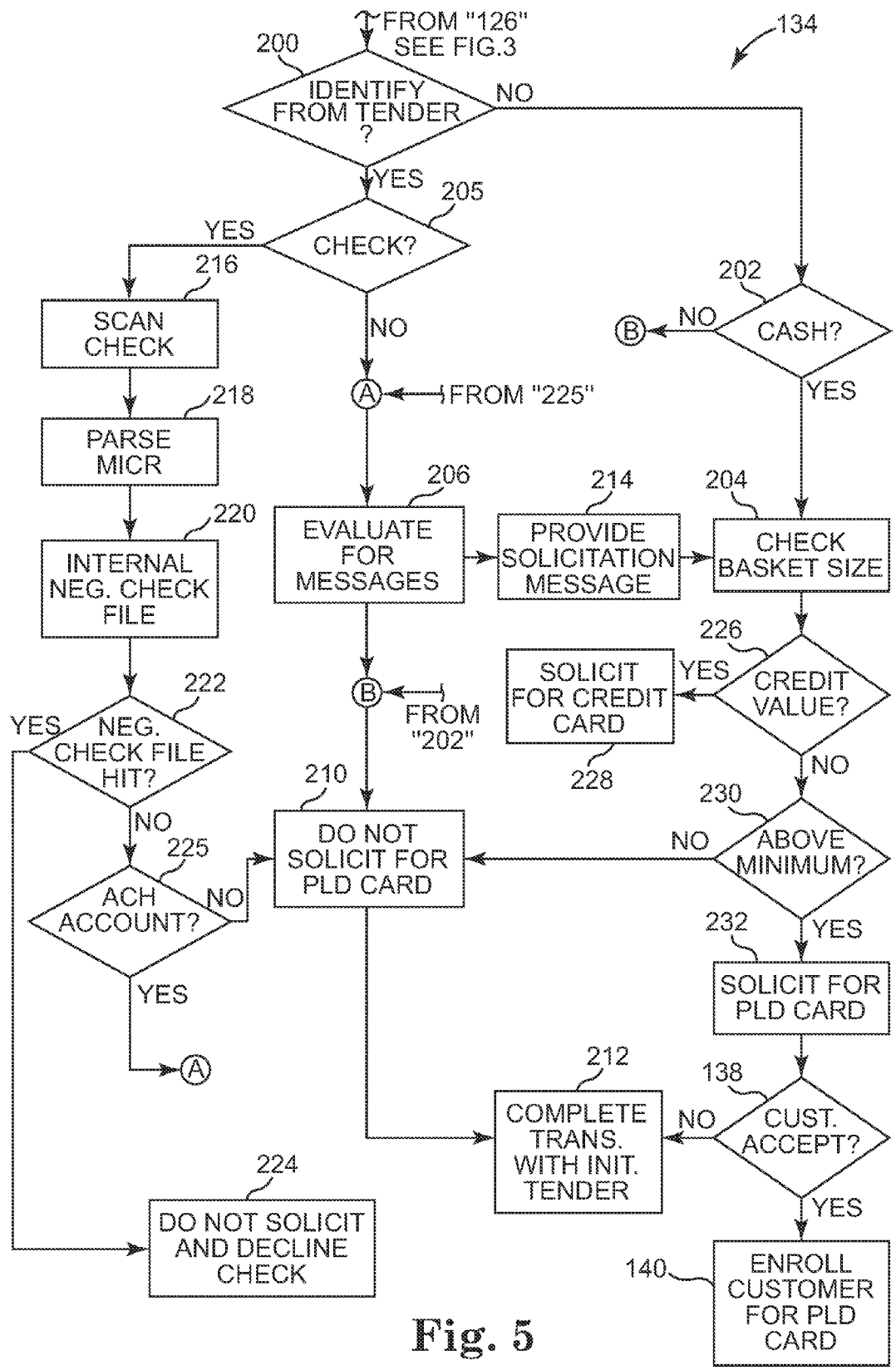
FIG. 5 is a flow diagram illustrating generally one embodiment of a solicitation process according to the present invention.

Solicitation module 80, as will be described in greater detail below with respect to FIG. 5, is configured to determine whether to solicit customers for a PLD card as part of an in-lane solicitation process carried out when a customer purchases a basket of items at a retail store checkout lane, such as at checkout lane 42 of retail store 34. However, it is also noted that the teachings described herein can also be applied to Internet-based purchases where a retail store, such as retail store 36, for example, comprises a retail website and a checkout lane comprises a combination of central computing network 32 and a customer's home computer, for example.

Figure 6:
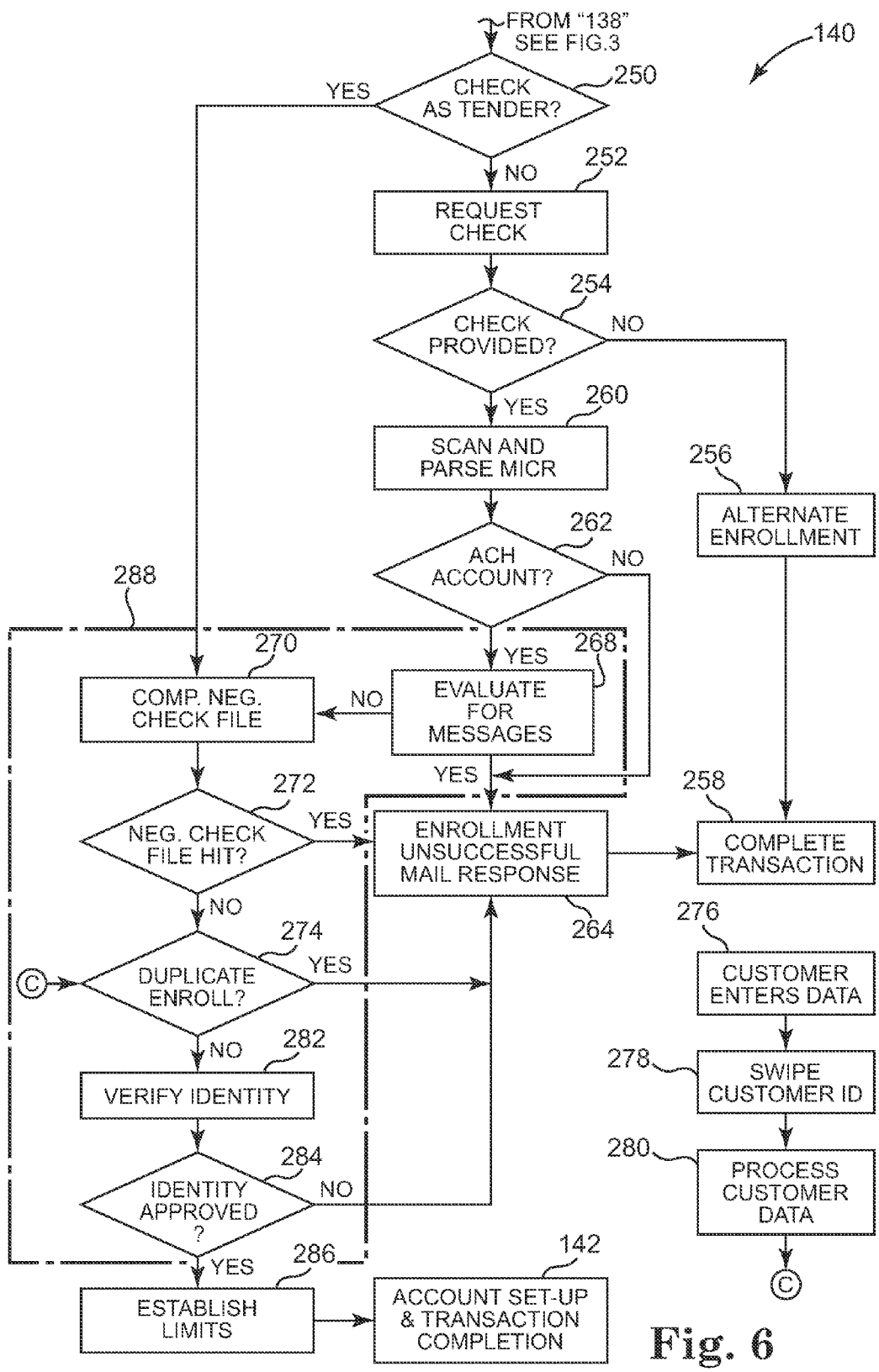
FIG. 6 is a flow diagram illustrating generally one embodiment of an enrollment process according to the present invention.

Enrollment module 82, as will be described in greater detail below with reference to FIG. 6, is configured to enroll and create PLD card accounts for customers who accepted in-lane solicitation requests generated by solicitation module 80. Messaging (MGS) module 86, as will be described in greater detail below, is configured to provide messages associated with the processes of solicitation and enrollment modules 80 and 82. In one embodiment, MGS module 86 includes a customer evaluation module 88 which evaluates known customers of the retail corporation (e.g. those customers who are known from previous transactions with the retail corporation and can be identified through various means such as, for example, their names, street addresses, ZIP codes, driver's license numbers, and third party credit and debit card accounts) as to whether the customer should be solicited for a PLD card and/or for a credit card associated with the retail corporation, or should not be solicited. In one embodiment, customer evaluation module 88 is updated on a daily basis so as to include new customers and to re-evaluate already known customers.

Check writer module 90 is configured to maintain and update a check writer history of all customers who have used checks as tender with the retail corporation. Check writer module 90 tracks the check writer history of customers based on various criteria, such as DDA account numbers and individual driver's license numbers, for example, so that the check writer history of customers is maintained even if the customer has multiple DDAs or opens a new DDA. In one embodiment, as will be described in greater detail below, check writer module 90 includes a rating module 91 which is configured to generate a check writer rating for all customers based on their associated check writer history. In one embodiment, those customers having an active check writer history with the retail corporation have higher check writer ratings than those customers having a limited or no check writer history with the retail corporation.

Internal EPD file 92 comprises a copy of EPD database 70 compiled by Federal Reserve 68. In one embodiment, internal EDP file 92 is periodically updated, such as on a daily basis, for example, with an up-to-date version of EPD database 70 so as to comprise an up-to-date list of routing numbers of EPD participating financial institutions.

Transaction database 94 is configured to maintain a history of interactions between customers and the retail corporation. For example, purchases with non-cash tenders (e.g., third party credit cards, third party debit cards, PLD debit card, credit cards associated with the retail corporation) are entered into transaction database 94 along with relevant information such as, for example, the customer's name, account number of the tender, the customer's driver's license number, and the transaction amount.

Account database 95 is configured to maintain a record of customer account and enrollment data for all accounts with the retail corporation. In addition to PLD card accounts, such accounts include branded credit card accounts and private label credit card accounts with the retail corporation. In addition to account numbers and PIN numbers (for debit accounts), the accounts include customer related information such as, for example, addresses, social security numbers, driver's license numbers, and other personal identification information.

Comprehensive negative check file 96 includes an external negative check file 98 and an internal negative check file 100. External negative check file 98 comprises a copy of the external negative check file 50 compiled by check authorization service 48. In one embodiment, external negative check file 98 is periodically updated, such as on a daily basis, for example, with an up-to-date version of the external negative check file 50 of check authorization service 48. Internal negative check file 100 comprises a list of currently outstanding checks which have not been paid due to non-sufficient funds (NSF) which have been received and discovered internally by the retail corporation at any of its retail store locations, such as retail stores 34 and 36.

Figure 3:
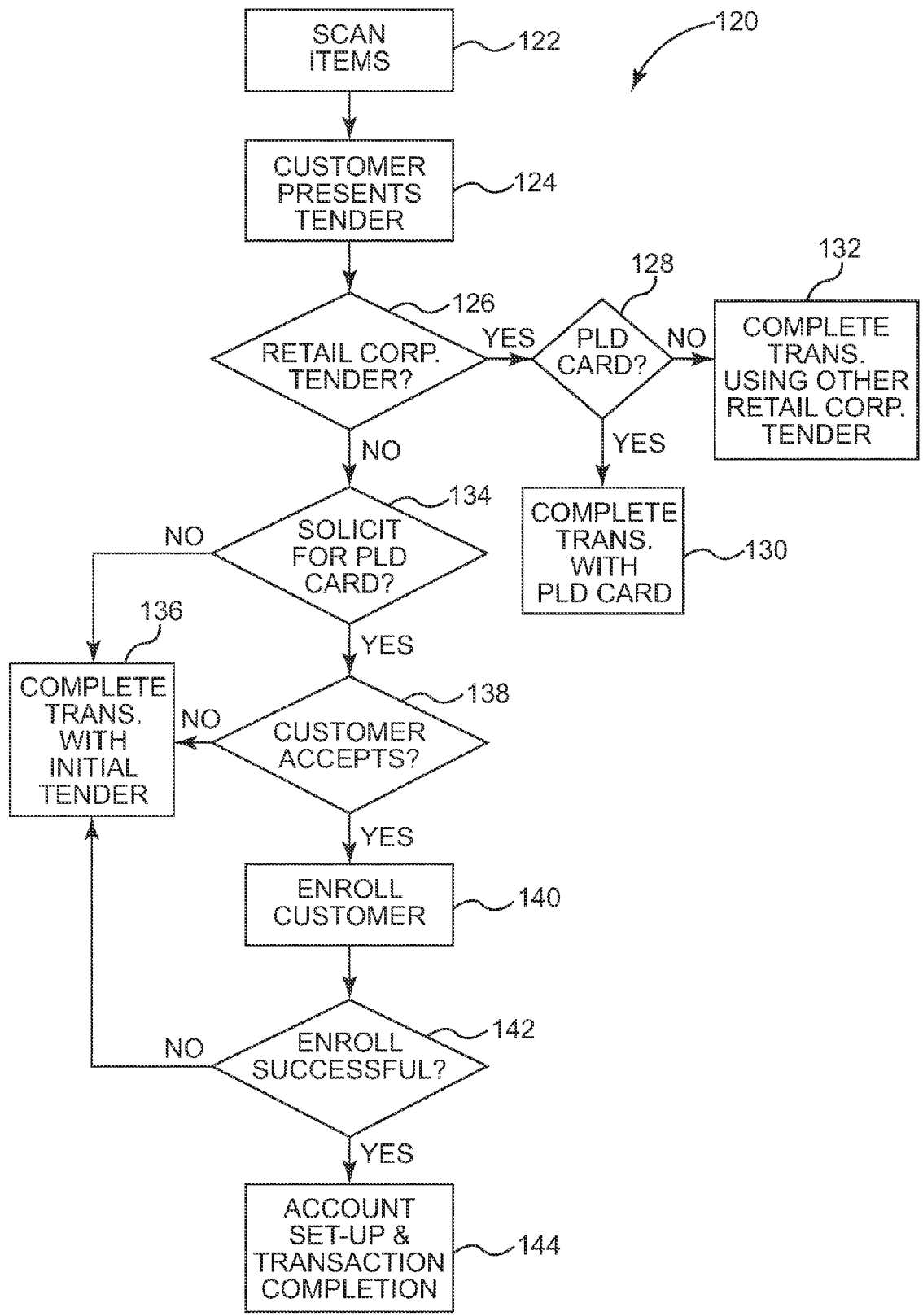
FIG. 3 is a flow diagram illustrating generally one embodiment of a transaction process according to the present invention.

FIG. 3 is a flow diagram illustrating generally one embodiment of a transaction process 120 executed by system 30, with further reference being made to FIGS. 1 and 2 above. Process 120 begins at 122 where a cashier at checkout lane 42 scans items from a basket of items selected for purchase by a customer at retail store 34. At 124, the customer presents a tender for payment, such as cash, a check, a third party credit card, a third party debit card, PLD card, or a retail corporation branded or private label credit card, for example. At 126, POS device 38 queries whether the presented tender comprises a PLD card issued by the retail corporation or a branded or private label credit card.

If the answer to the query at 126 is "yes", process 120 proceeds to 128, where POS device 38 determines whether the presented tender is a PLD card. If the presented tender is a PLD card, process 120 proceeds to 130 where POS device 38 prompts the cashier to complete the transaction using the PLD card. One embodiment of a PLD card transaction process is illustrated in greater detail below with reference to FIG. 4. If the presented tender is not a PLD card, meaning that the presented tender is a credit card associated with the retail corporation, process 120 proceeds to 132 where POS device 38 prompts the cashier to complete the transaction using the presented credit card.

If the answer to the query at 126 is "no", process 120 proceeds to 134, where a solicitation process is performed by solicitation module 80 to determine whether to solicit the customer for a PLD card or, in one embodiment, for a private label credit card issued by the retail corporation. One embodiment of such a solicitation process is described in further detail below with reference to FIG. 5 below. If the solicitation process at 134 determines that the customer should not be solicited, process 120 proceeds to 136 where POS device 38 prompts the cashier to complete the transaction using the presented tender.

If the solicitation process at 134 determines that the customer should be solicited, process 120 proceeds to 138, where POS device 38 prompts the cashier to ask whether the customer would like to apply for a PLD card. If the customer declines, process 120 proceeds to 136 where, as described above, POS device 38 prompts the cashier to complete the transaction using the presented tender. If the customer accepts the solicitation and wishes to obtain a PLD card, process 120 proceeds to 140 where an enrollment process is performed by enrollment module 82 to enroll the customer for a PLD card. One embodiment of an enrollment process is described below with reference to FIG. 6.

At 142, if the enrollment process is unsuccessful, process 120 proceeds to 136 where POS device 38 prompts the cashier to complete the transaction using the presented tender. If the enrollment process at 142 is successful, process 120 proceeds to 144 where enrollment module 82 performs an account set-up process and completes the transaction using the newly opened PLD card account. One embodiment of an account set-up and transaction completion process is described below with reference to FIG. 7.

Figure 4:
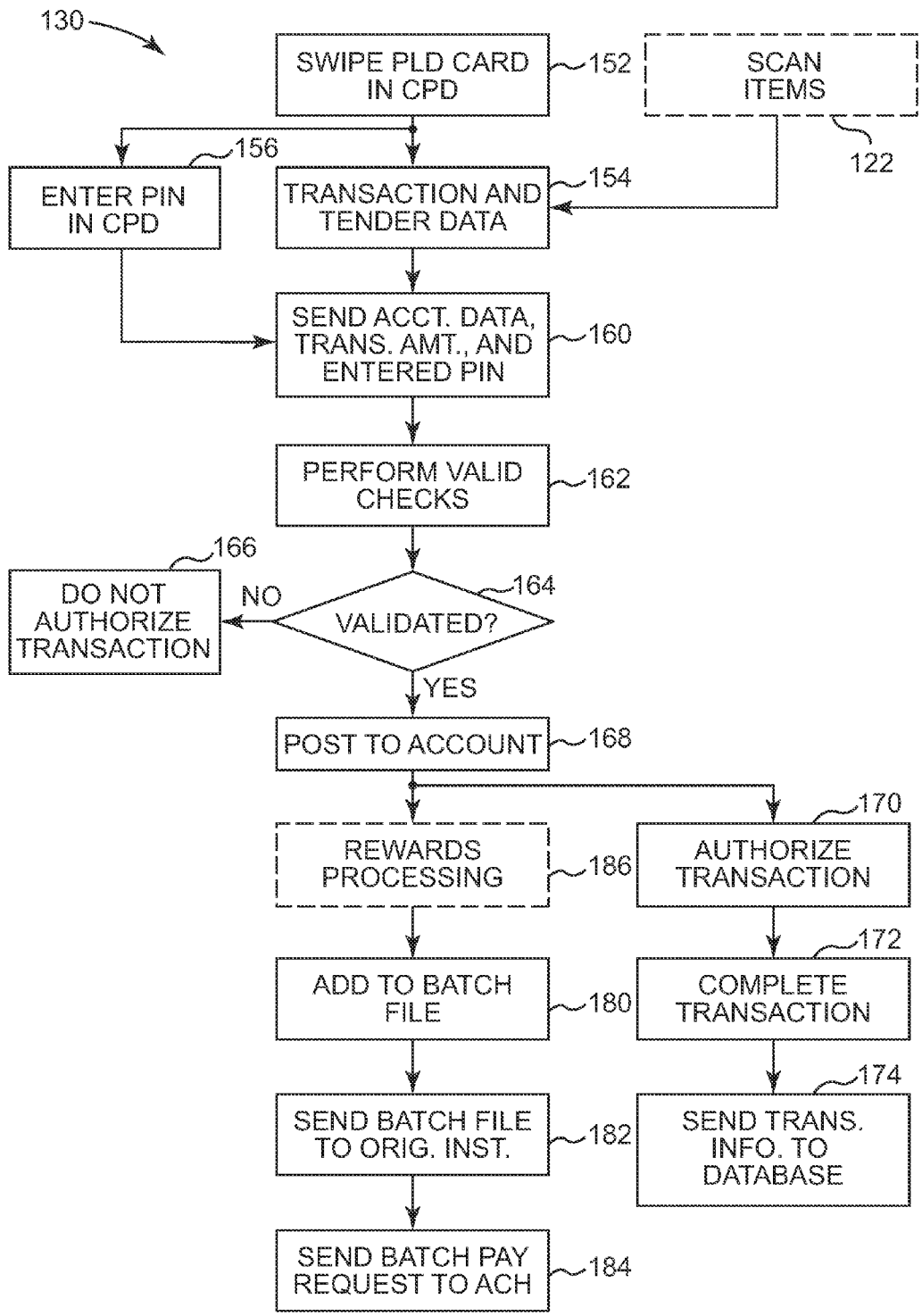
FIG. 4 is a flow diagram illustrating generally one embodiment of a transaction process for a retailer private label debit card according to the present invention.

FIG. 4 is a flow diagram illustrating generally one embodiment of transaction process 130 executed by system 30 for performing a transaction with a previously opened PLD card and account, with further reference to FIGS. 1-3 above. Process 130 begins at 152 where, after a cashier at checkout lane 42 scans items from a basket of items selected for purchase by the customer at retail store 34 and the customer has presented a PLD card from a previously opened account as tender, CPD 40 prompts the customer to swipe the PLD card. At 154, the scanned transaction data from 122 (see FIG. 3) and tender data (e.g. account number, customer's name) obtained by CPD 40 at 152 are combined.

At 156, after swiping the PLD card at 152, CPD 40 prompts the customer to enter their PIN. At 160, the customer entered PIN is combined with the transaction and tender data from 154 and transmitted to card processor 52. At 162, card processor 52 performs validation checks on the data transmitted at 160. In one embodiment, validation checks performed by card processor 52 include verifying that the customer entered PIN matches a PIN entered by the cardholder at enrollment, and that velocity limits associated with the card have not been exceeded (see also FIG. 6). As will be described in greater detail below, velocity limits refer to a spending limit and a number of times a PLD card may be used for purchases in a given time period.

At 164, if the validation checks at 162 fail, process 130 proceeds to 166 where card processor 52 transmits a non-authorized message to central computing network 32, and POS device 38 informs the cashier that the transaction cannot be authorized. In one embodiment, the customer is given at least one opportunity to re-enter their PIN and 160 through 164 are repeated. If the validation checks at 162 continue to fail, the customer can choose to terminate the transaction or to complete the transaction using a different tender. If the validation check is successful and the PLD card is validated, process 130 proceeds to 168 where card processor 52 posts the transaction to and updates the cardholder's account.

At 170, after posting the transaction to the cardholder's account, card processor 52 provides an authorization message to central computing network 32 indicating that the transaction is authorized. At 172, POS device 38 informs the cashier that the transaction is authorized and to complete the transaction, which includes printing and providing a receipt for the customer. At 174, POS device 38 provides transaction data and PLD card account data to transaction database 94.

At 180, after posting the transaction to the cardholder's account, card processor 52 posts the transaction to transaction batch file 54 (see FIG. 1) associated with the retail corporation, with batch file 54 including all authorized PLD card transactions with the retail corporation within a designated time period, such as a 24-hour time period. At 182, upon expiration of the designated time period, card processor 52 generates and transmits an auto-pay batch file, based on transaction batch file 54, to originating financial institution 62. Subsequently, at 184, originating financial institution 62 transmits the auto-pay batch file to EPD system 60 which requests funds from the appropriate cardholder DDAs 64 of the receiving financial institutions 66. The received funds are then transmitted from EPD system 60 to originating financial institution 62 and on to central computing network 32 of the retail corporation.

In one embodiment, as illustrated by the dashed lines at 186, after posting the transaction to the cardholder's account at 168, card processor 52 updates certain rewards or incentives programs offered by the retail corporation for purchases with the PLD card based on the transaction validated at 164. Examples of such rewards or incentives programs may include, for example, earning of discounts on future purchases and donations to eligible school(s) designated by the cardholder.

Although not described explicitly herein, it is noted that during transaction process 120 as described and illustrated by FIG. 4, for security purposes, the PIN entered by the customer is encrypted in accordance with standardized PCI PIN encryption requirements, such encryption provider 46.

FIG. 5 is a flow diagram, with further reference to FIGS. 1-3, illustrating generally one embodiment of in-lane solicitation process 134 executed by solicitation module 80 of system 30 for determining whether to solicit a customer to enroll for a PLD card when purchasing items at checkout lane 42 of retail store 34. In one embodiment, as illustrated by FIG. 5, process 134 also determines whether to solicit the customer to apply for a private label credit card issued by the retail corporation.

Process 134 begins at 200, after being determined at 126 (see FIG. 3) that the tender presented by the customer is not a PLD card or a retail corporation branded or private label credit card. At 200, POS device 38 determines whether it is possible to identify the customer from the presented tender. Examples of tenders from which it is possible to identify a customer include checks and third party non-cash tenders, such as third party credit cards. Examples of tenders from which it is not possible to identify a customer include cash, gift cards, and traveler's checks, to name a few.

At 200, if it is not possible to identify the customer from the presented tender, process 134 proceeds to 202 where POS device 38 determines whether the presented tender is cash. If the presented tender is cash, process 134 proceeds to 204 where, as will be described in greater detail below, the basket size or purchase amount is checked. If the presented tender is not cash (e.g. gift card, traveler's check), process 134 proceeds to 210 where the customer is not to be solicited.

Returning to 200, if it is possible to identify the customer from the presented tender, process 134 proceeds to 205 where POS device 38 determines whether the presented tender is a check. If the presented tender is not a check, the presented tender comprises a third party tender of some variety (e.g. third party debit card, third party credit card), and process 134 proceeds to 206 where, based on customer data associated with the presented tender, messaging module 86 evaluates which type of solicitation-related message(s) to issue. As will be described in greater detail below, such messages include, for example, messages to solicit the customer for a PLD card and/or a private label credit card and messages to not solicit the customer.

Although not described explicitly above, at 126 of transaction process 120 of FIG. 3, the third party non-cash tender presented for payment by the customer is swiped through CPD 40 and account and other customer-related data stored thereon (e.g. account numbers, customer's name, address, ZIP code, and other personal identifying information) is transmitted from CPD 40 to central computing network 32. In one embodiment, messaging module 86 uses the customer data to identify and determine whether the customer is known to the retail corporation. For example, in one embodiment, messaging module 86 accesses transaction database 94 to determine whether the customer has had previous contact with or has previously purchased items from the retail corporation. In one embodiment, messaging module 88 checks the customer data against account database 95. As described above, account database 95 includes a list of all customer accounts (e.g. PLD card accounts, and branded and private label credit cards issued or associated with the retail corporation) with the retail corporation.

If the customer was able to be identified and is therefore known to the retail corporation, messaging module 86 determines whether there is a reason to not solicit the customer. Reasons for determining not to solicit the customer include, for example, that the customer has a bad account with the retail corporation, that the customer was recently solicited, and whether the customer has an existing account with the retail corporation (e.g. a PLD account and/or a branded or private label debit card associated with the retail corporation). In one embodiment, as described herein, a customer already having a PLD card will not be solicited for a private label credit card and, similarly, will not be solicited for a PLD card if already having a private label credit card. However, in other embodiments, a customer already having a PLD card may be solicited for a private label credit card and vice versa.

In one embodiment, as described above with respect to FIG. 2, messaging module 86 includes customer evaluation module 88 which, on and on-going basis, individually evaluates known customers of the retail corporation as to whether the customer should be solicited for a PLD card and/or for a private label credit card issued by the retail corporation.

If a reason for not soliciting a known customer is found at 206, the customer will not to be solicited, as indicated at 210, and process 134 proceeds to 212 where POS device 38 prompts the cashier to complete the transaction using the presented tender. If no reasons are found for rejecting solicitation of a known customer or the customer is unknown to the retail corporation, process 134 proceeds to 214, which will be described in greater detail below.

Returning to 205, if the presented tender is a check, process 134 proceeds to 216 where the cashier scans the check and POS device 38 reads the magnetic ink character recognition (MICR) line of the tendered check. The MICR line refers to a code on the check which includes the account number of the associated DDA and the routing number of the corresponding financial institution maintaining the DDA, such as the account number of DDA 64 of receiving financial institution 66. At 218, POS device 38 provides the MICR to solicitation module 80 which parses the MICR to identify the routing number of the issuing financial institution.

At 220, the MICR is compared to only the internal negative check file 100 of comprehensive negative check file 96. External negative check file 98 is not utilized for purposes of solicitation. At 222, if there is a match or "hit" between the MICR number and internal negative check file 100, meaning that there is a currently outstanding check associated with the associated DDA that has not been paid due to NSF or that the DDA is closed or known to be fraudulent, for example, process 134 proceeds to 224. At 224, solicitation module 134 determines that the customer is not to be solicited, and POS device 38 informs the cashier that the check has been declined, at which point the customer can choose to terminate the transaction or complete the transaction using a different tender.

If there is not a match between the MICR and internal negative check file 100 at 222, process 134 proceeds to 226. At 226, solicitation module 80 compares the MICR to internal EPD file 92. If there is not a match between the MICR and internal EPD file 92, meaning that the customer's financial institution is not registered with EPD system 60, process 134 first proceeds to 210, where it is determined that the customer is not to be solicited, and then to 212 where POS device 38 prompts the cashier to complete the transaction using the presented tender.

If there is a match between the MICR and internal EPD file 92 at 226, meaning that the routing number of the associated financial institution is registered with EPD system 60, process 134 proceeds to 206. In a fashion similar to that described above with respect to customer data obtained from a third party tender, messaging module 86 uses the MICR and customer data associated therewith to determine whether there is a reason that the customer should not be solicited. For example, if the DDA from the MICR is indicated as being a non-viable account (e.g. is closed or is known to be a fraudulent account), or if the customer already has an existing account with the retail corporation (e.g. a PLD card and/or a private label debit), the customer is not to be solicited.

If a reason for declining solicitation is found based on customer data associated with the MICR, the customer will not be solicited, as indicated at 210, and process 134 proceeds to 212 where POS device 38 prompts the cashier to complete the transaction using the presented tender. If no reasons are found for declining solicitation of the customer, process 134 proceeds to 214.

At 214, based on the customer data obtained via the third party tender or via the MICR at 218, messaging module 86 provides a solicitation message to POS device 38. In one embodiment, as mention above, the solicitation message provided at 214 is based on the customer evaluations performed by customer evaluation module 88. In one embodiment, the solicitation message informs POS device 38 that the customer is approved to be solicited for only a PLD card. In one embodiment, the solicitation message informs POS device 38 that the customer is approved be solicited for only a private label credit card issued by the retail corporation. In one embodiment, the solicitation message informs POS device 38 that that customer is approved to be solicited for both a private label credit card and a PLD card. In one embodiment, when the customer is unknown to the retail corporation, the solicitation message informs POS device 38 that the customer may be solicited for both a private label credit card and a PLD card and is, thus, treated similarly to an unidentified customer presenting cash as tender.

At 204, the basket size or the value of the items being purchased by the customer is evaluated in conjunction with the solicitation messages received from messaging module 86 at 214. At 226, if the customer is approved to be solicited for a private label credit card and the basket size is greater than or equal to a predetermined credit value, such as $50 for example, process 134 proceeds to 228 where POS device 38 prompts the cashier to solicit the customer for a retail corporation issued private label credit card. A credit enrollment and account set-up process, which is not discussed herein, is then utilized to generate a new credit-based account should the customer accept the solicitation.

If the basket size is below the predetermined credit value or if the solicitation message received from messaging module 86 at 214 indicates that the customer is not approved to be solicited for a private label credit card, process 134 proceeds to 230. At 230, if the solicitation message received from messaging module 86 at 214 indicates that the customer is not approved to be solicited for a PLD card or if the basket size is below a predetermined minimum PLD value, such as $5 for example, process 134 proceeds to 210 where the customer is not solicited and then to 212 where POS device 38 prompts the cashier to complete the transaction using the initially presented tender.

At 230, if the basket size is above the predetermined minimum PLD value and if the solicitation message received from messaging module 86 at 214 indicates that the customer is approved to be solicited for a PLD card, process 134 proceeds to 232, where POS device 38 prompts the cashier to solicit the customer for a PLD card. As described above at 138 of FIG. 3, if the customer declines the 232 solicitation, process 134 proceeds to 212 where the cashier completes the transaction using the initial tender. If the customer accepts the 232 solicitation, process 134 proceeds to 140 where an enrollment process is initiated, as described in greater detail below with respect to FIG. 6.

By not soliciting those customers who present checks as tender when the check is indicated as being associated with a demand deposit account having an unpaid check appearing in the retail corporation's internal negative check file 100, as being associated with a non-viable demand deposit account (e.g. known to be closed or fraudulent) by messaging module 86, or as being associated with a financial institution that is not part of electronic payment delivery system 60, solicitation process 134 of system 30 of the present invention causes solicitation of those customers more likely to be viable applicants for the PLD card thereby enabling a cashier and checkout lane at a retail store to be more efficient by not soliciting every customer and also reducing potential financial risk to the retail corporation. Similar efficiency benefits are provided by determining not to solicit those customers presenting checks or third party non-cash tenders who are identified as already having an account of some type (e.g. PLD card account, retail corporation associated credit card account) with the retail corporation and those customers whose basket size is below a minimum value. Additionally, by soliciting those customers who are paying with cash or a third party non-cash tender based on the basket size of their purchase, the customer is solicited for the retail corporation issued tender (e.g., credit card or PLD card) more likely to be used by the customer.

FIG. 6 is a flow diagram, with further reference to FIGS. 1-3, illustrating generally one embodiment of an in-lane enrollment process 140 executed by enrollment module 82 of system 30 for enrolling customers for a PLD card when purchasing items at checkout lane 42 of retail store 34. Process 140 begins at 250 after a customer accepts the solicitation to enroll for a PLD card at 138 (see FIGS. 3 and 5). At 250, if the customer did not present a check as tender for the purchase, POS device 238 prompts the cashier to request a check from the customer, as indicated at 252.

If the customer is unable to provide a check, the in-lane enrollment process is terminated and process 140 proceeds to 256 where POS device 238 prompts the cashier to inform the customer of alternate PLD card enrollment means, such as by directing the customer to a customer service counter to obtain a traditional mail-in enrollment form or to enroll via an on-line enrollment process. Such enrollment methods are commonly referred to as "back office" enrollment procedures.

If the customer provides a check at 254, process 140 proceeds to 260 where the check is scanned to read the MICR and the MICR is parsed, similar to that described above with respect to 216 and 218 of FIG. 5. Process 140 then proceeds to 262 where enrollment module 82 compares the MICR to internal EPD file 92 in a fashion similar to that described above with respect to 226. If there is no match between the MICR and internal EPD file 92, the customer's financial institution is not registered with EPD system 60, and process 140 proceeds to 264. At 264, POS device 38 prompts the cashier to inform the customer that the enrollment has been denied and that an explanation will be received in the mail. The transaction is then completed using the initial tender, as indicated at 258.

If there is a match at 262 between the MICR and internal EPD file 92, meaning that the customer's financial institution is registered with EPD system 60, process 140 proceeds to 268. At 268, in a fashion similar to that described above with respect to 206 of FIG. 5 and based on customer data associated with the MIRC, messaging module determines whether there is a reason that the customer should not be allowed to enroll for a PLD card. For example, if the DDA associated with the MICR is indicated as being a non-viable DDA (e.g. closed account, known fraudulent account), enrollment will not be allowed. If messaging module 86 determines at 268 that there is a reason to not allow enrollment, process 140 proceeds to 264 where enrollment is denied, and then to 258 where POS device 38 prompts the cashier to inform the customer that the check has been declined and that the customer may terminate the transaction or complete the transaction using a different tender.

If messaging module 86 determines that there is not a reason to deny enrollment, process 140 proceeds to 270 where enrollment module 82 compares the MICR to comprehensive negative check file 96, which includes both external negative check file 98 and internal negative check file 100. Note that at 250, if a check was initially offered as tender, process 140 proceeds directly to 270, as the MICR has already been scanned and parsed at 216 and 218, and has already been compared against EPD file 92 and customer data has already been evaluated by messaging module 86 as part of solicitation process 134. However, the MICR has been checked against only internal negative check file 100 at 220, so that at 270, the MICR is now checked against comprehensive negative check file 96.

If there is a match or "hit" between the MICR number and comprehensive negative check file 96 at 272, process 140 proceeds to 264 where enrollment is denied, and then to 258 where POS device 38 prompts the cashier to inform that customer that the check has been declined and that he/she may terminate the transaction or complete the transaction with a different tender. If there is not a match between the MICR number and comprehensive negative check file 96 at 272, process 140 proceeds to 274.

Simultaneous with at least a portion of the above described portions of process 140, POS device 38 prompts the customer to enter enrollment data into CPD 40, as indicated at 276. The data entered by the customer includes, for example, the customer's social security number, date of birth, address, home phone, and an alternate phone number. Additionally, the customer is prompted by CPD 40 to enter a PIN of the customer's choosing. The customer is also prompted for his/her signature as verification that the entered information is correct and that he/she agrees with terms of the PLD card agreement. Similar to that described above with respect to FIG. 4, it is noted that during enrollment process 140 as described and illustrated by FIG. 6, for security purposes, the PIN chosen and entered by the customer is encrypted by CPD 40 and subsequently re-encrypted by encryption provider 46 in accordance with standardized PCI PIN encryption requirements.

At 278, POS device 38 prompts the cashier to request a form of identification from the customer, such as a driver's license or other ID, for example. The cashier then swipes the provided ID to capture identifying information stored thereon, such as a driver's license number, for example. At 280, customer enrollment data entered at 276 and ID data captured at 278 are processed and transmitted by CPD 40 to central computing system 32 at 274, where enrollment module 82 compares the data against account database 95 to check for duplicate enrollment of the customer. If there is a match with account database 95 that is indicative of duplicate enrollment, process 140 proceeds to 264 where POS device 38 prompts the cashier to inform the customer that the enrollment has been denied that an explanation will be received in the mail. The transaction is then completed using the initial tender, as indicated at 258.

If there is no indication of duplicate enrollment at 274, process 140 proceeds to 282 where the enrollment data is transmitted to risk management service 56 for verification. One example of such a risk management service is LexisNexis® whose RiskWise® on-line information verification service analyzes and provides validation scores for the customer enrollment data, wherein the higher the validation score the higher the likelihood that the customer provided enrollment data is accurate. The validation score generated by risk management service 56 is transmitted to enrollment module 82 of central computing system 32.

In one embodiment, enrollment module 32 includes a predetermined validation threshold score which must be met or exceeded by the validation score received from risk management service 56 for the customer enrollment data to be considered accurate and verifiable. In one embodiment, the predetermined validation threshold score is adjusted based on the customer's check writer rating generated by rating module 91 of check writer module 90. As described above, check writer module 90 is configured to maintain and update a check writer history of all customers who have used checks as tender with the retail corporation. Based on the customer's check writer history, rating module 91 is configured to generate a check writer rating. In one embodiment, factors utilized by rating module 91 to determine the check writer rating include the number of checks written, the total dollar amount of checks written, and a time period over which the checks were written.

In one embodiment, those customers having written a large number of checks totaling a large dollar amount in a short time period receive a higher check writer rating relative to those customers having written a small number of checks over a long time period, with those customers having no check writer history with the retail corporation being given the lowest check writer rating. In one embodiment, for example, rating module 91 generates check writer ratings between "0" and "5", with a rating of "0" being given to those customers having no check writer history with the retail corporation being given a check writer rating of "0".

In one embodiment, as described above, enrollment module 32 adjusts the predetermined validation threshold score based on the customer's check writer rating. For example, in one embodiment, enrollment module 32 adjusts the predetermined validation threshold score so that customers with the highest check writer rating have the lowest predetermined validation threshold score and those customers having the lowest check writer rating (i.e. customers with no check writer history with the retail corporation) having the highest predetermined validation threshold score.

At 284, if the validation score received from risk management service 56 is less than the adjusted validation threshold score, enrollment is denied and process 140 proceeds to 264 where POS device 38 prompts the cashier to inform the customer that the enrollment was unsuccessful and that an explanation will be provided to the customer via mail or other medium. Process 140 then proceeds to 258 where the transaction is completed using the initial tender. If the validation score at 284 is greater than or equal to the adjusted validation threshold score, enrollment is approved and process 140 proceeds to 286. At 286, enrollment module 82 establishes so-called "velocity limits" for the PLD account. In one embodiment, the velocity limits comprise a spending or dollar limit and a frequency of use limit (i.e. a number of times the PLD card may be used in a given time period) for the PLD card account. In one embodiment, the velocity limits are based on the check writer rating generated by check writer module 90. In one embodiment, those customers having the highest check writer rating (i.e. those having the most established history with the retail corporation) are assigned the highest velocity limits (i.e. the highest dollar limit and frequency of use limit) while those having the lower check writer rating are assigned the lowest velocity limits. After establishing the velocity limits at 286, process 140 proceeds to 142 where an account set-up and transaction completion process, which is described in greater detail below.

Together, the processes of 268, 270, 274, 282, and 284 form at least a portion of a risk assessment process 288, as indicated by the dashed box. It is noted that in addition to those processes illustrated, any number of other factors or criteria may be evaluated as part of risk assessment process 288, such as, for example, verification of the age of the customer and whether the customer is a citizen of country listed by the Office of Foreign Assets Controls as a country with which U.S. citizens or corporations are not allowed to do business.

By adjusting required validation threshold scores for enrollment data validation and PLD card velocity limits based on an internal check writer history maintained by the retail corporation, enrollment process 140 of system 30 reduces financial risk (e.g. fraud, bad checks) to the retail corporation while reducing the likelihood that long-standing customer of the retail corporation will be denied enrollment or will be unduly restricted in using a PLD card.

Figure 7:
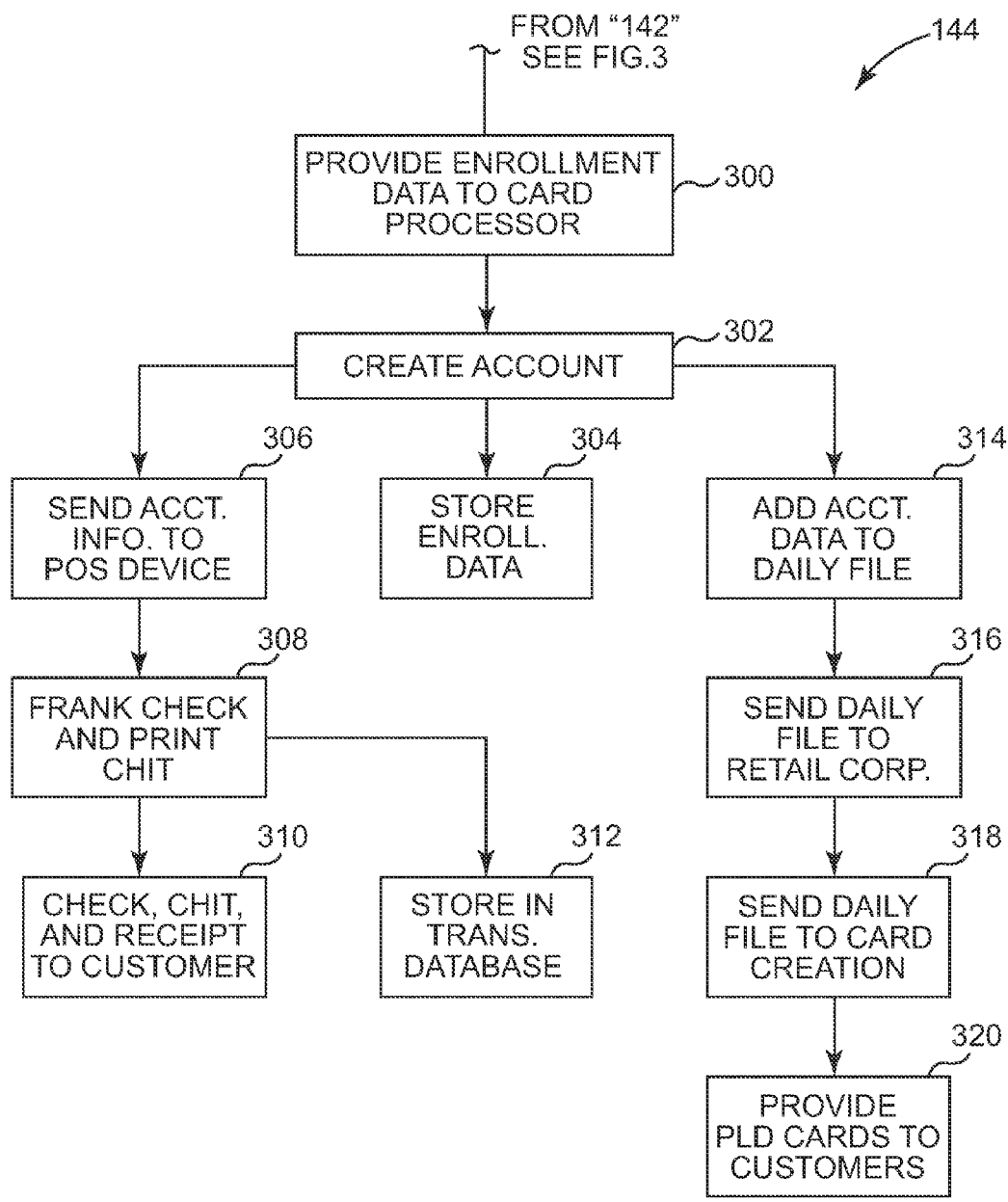
FIG. 7 is a flow diagram illustrating generally one embodiment of an account set-up and settlement process according to the present invention.

FIG. 7 is a flow diagram, with further reference to FIGS. 1-3, illustrating generally one embodiment of a PLD card account set-up and transaction completion process 144 executed by enrollment module 82 of system 30 after a customer has been approved for a PLD during an in-lane enrollment process when purchasing items at checkout lane 42 of retail store 34. As used herein, the term "PLD card account" does not refer to a financial account, such as a DDA, for example, but simply refers to data associated with the PLD card (e.g. PLD card number, cardholder's name and address, etc.) and which is necessary to carry out functions associated with the PLD card.

Process 144 begins at 300 after a customer is successfully enrolled at 142 (see FIG. 3). At 300, the customer enrollment data (e.g. social security number, date of birth, address, home phone number, driver's license, customer selected PIN) received during enrollment process 140 (see FIG. 6) is provided to card processor 52.

At 302, using the customer enrollment data received at 300, card processor 52 creates a PLD card account, including an account number, an encrypted version of the customer chosen PIN, and having the velocity limits established by enrollment process 140. At 306, card processor 52 sends the newly established PLD card account information to POS device 38. At 308, POS device 38 "franks" or voids the check provided by the customer for enrollment, applies the transaction data to the newly established account, and generates and prints a new account CHIT which serves as a temporary PLD card until the customer receives a permanent PLD card. In one embodiment, the initial transaction qualifies for any rewards programs that may be associated with the PLD card account (see also "186" of FIG. 4). At 310, the franked check, CHIT, and receipt are provided by the cashier to the customer. POS device 38 additionally, at 312, provides the transaction data and PLD card account data to transaction database 94 (see also "174" of FIG. 4).

At 314, after creating the PLD account at 302, card processor 52 adds the PLD account data to a new account file comprising all PLD accounts created for the retail corporation during a given time period, such as a 24-hour period, for example. In one embodiment, as indicated at 316, card processor 52 transmits the new account file to central computing system 32 on a daily basis. At 318, the new account file is transmitted to card supplier 74 who creates and mails a permanent PLD card to the customers, as illustrated at 320.

Although described herein primarily with regard to a checkout lane at a retail store, it is noted that aspects of system 30 as described above with reference to FIGS. 1-7 can be readily applied to so-called back office solicitation and enrollment procedures as well. Back office procedures refer generally to traditional paper enrollment forms mailed or otherwise submitted to a retail corporation and on-line enrollment processes.

Components of the present invention can be implemented in hardware via a microprocessor, programmable logic, or state machine, in firmware, or in software with a given device. In one aspect, at least a portion of the software programming is web-based and written in HTML and JAVA programming languages, including links to user interfaces, such as a Windows based operating system, and each of the main components may communicate via a network using a communication protocol. For example, the present invention may or may not use a TCP/IP protocol for data transport. Other programming languages and communication protocols suitable for use with the present invention will become apparent to those skilled in the art after reading the present application. Components of the present invention may also reside in software on one or more computer-readable mediums, which is defined herein to include any kind of memory, volatile or non-volatile, such as floppy disks, hard drives, read-only memory (ROM), CD-ROMs, flash memory, and random access memory (RAM).

Although the invention has been described with respect to particular embodiments, such embodiments are for illustrative purposes only and should not be considered to limit the invention. Various alternatives and changes will be apparent to those of ordinary skill in the art.

What is claimed is:

1. A method of processing a purchase transaction for one or more items, the method comprising:
   receiving, at a central computing network, magnetic ink character recognition (MICR) information associated with a financial account of a customer, wherein:
     the central computing network includes a solicitation processor and a comprehensive negative check file,
     the comprehensive negative check file is maintained by a retail corporation and comprises an internal negative check file and an external negative check file,
     the internal negative check file includes at least a list of outstanding checks to the retail corporation that are unpaid due to non-sufficient funds, and
     the external negative check file includes a copy of a file compiled by a third party check authorization service, and
   using the solicitation processor of the central computing network to determine whether to solicit the customer to apply for a financial transaction card, wherein using the solicitation processor includes:

determining if any of a plurality of predefined reasons exist not to solicit the customer to apply for the financial transaction card, wherein one of the plurality of predefined reasons includes if the MICR information associated with the financial account of the customer matches MICR information of a check listed in the comprehensive negative check file, if any of the plurality of predefined reasons exist, deciding not to solicit the customer to apply for the financial transaction card, and if none of the plurality of predefined reasons exist, deciding to solicit the customer to apply for the financial transaction card.

2. The method of claim 1, wherein the financial transaction card is a retail debit card, and receiving the MICR information includes receiving the MICR information via a device processing the purchase transaction at a location of the customer and in communication with the central computing network.

3. The method of claim 2, wherein the device processing the purchase transaction is a point-of-sale device located in a retail store associated with the retail corporation.

4. The method of claim 1, wherein the central computing network further comprises a messaging module, and the method further comprises:

the messaging module issuing a solicitation message to a device processing the purchase transaction based on a determination made by the solicitation processor whether to solicit the customer to apply for the financial transaction card, wherein the solicitation message instructs the device processing the purchase transaction to solicit the customer to apply for the financial transaction card before completing the purchase transaction.

5. The method of claim 1, wherein, if, while using the solicitation processor to determine whether to solicit the customer to apply for the financial transaction card, it is determined that the customer should be solicited to apply for the financial transaction card, the method further includes:

sending instructions to the device processing the purchase transaction to solicit the customer to apply for the financial transaction card; and if the customer accepts the solicitation, enrolling the customer for the financial transaction card including receiving customer instructions for funding the financial transaction card, and applying funds of the financial transaction card to pay for one or more items being purchased by the customer during the purchase transaction.

6. The method of claim 1, wherein:

the central computing network includes an internal electronic payment delivery (EPD) system file maintained by the retail corporation and comprising a list of financial institutions participating in an EPD system associated with the retail corporation, each financial institution in the list of financial institutions has a corresponding routing number, the MICR information associated with the financial account of the customer includes a routing number associated with the financial account of the customer, the plurality of pre-defined reasons include the routing number associated with the financial account of the customer being absent from the internal EPD system file, and determining if any of the plurality of predefined reasons exists includes:

using the solicitation processor to compare the routing number associated with the financial account of the customer to the internal EPD system file and to determine if the routing number associated with a financial account of the customer is absent from the internal EPD system file.

7. The method of claim 6, wherein the EPD system comprises an automated clearing house system.

8. The method of claim 1, wherein:

the central computing network includes a list of MICR information from checks previously discovered by the retail corporation to be associated with non-viable demand deposit accounts (DDAs), the plurality of predefined reasons include a demand deposit account (DDA) number and a routing number of the MICR information associated with the financial account of the customer matching an account number and a routing number of any MICR information associated with the non-viable DDAs, and determining if any of the plurality of predefined reasons exists includes:

using the solicitation processor to determine if the DDA number and the routing number of the MICR information associated with the financial account of the customer match an account number and a routing number of any MICR information associated with the non-viable DDAs.

9. The method of claim 1, wherein:

the central computing network includes an account database having a list of credit and debit accounts associated with the retail corporation, the plurality of predefined reasons includes the customer having an existing debit account associated with the retail corporation, and determining if any of the plurality of predefined reasons exists includes:

using the solicitation processor to determine an identity of the customer based on the MICR information associated with the financial account of the customer and to determine if the customer has an existing debit account associated with the retail corporation including accessing the account database.

10. The method of claim 1, wherein receiving the MICR information associated with a financial account of the customer includes scanning a check received from the customer.

11. The method of claim 1, wherein the method further comprises:

establishing a check writer rating for the customer based on a history of checks associated with the customer and previously tendered to the retail corporation;

setting a validation threshold score;

adjusting the validation threshold score based on the check writer rating of the customer to provide an adjusted validation threshold score;

comparing a validation score to the adjusted validation threshold score, the validation score being indicative of a validity of enrollment data collected about the customer, to the adjusted validation threshold score;

denying enrollment if the validation score is less than the adjusted validation threshold score; and deeming the enrollment data as valid if the validation score is at least equal to the adjusted validation score.

12. The method of claim 11, wherein establishing the check writer rating includes:

establishing a range of check writer ratings having a lowest check writer rating and a highest check writer rating; and selecting the check writer rating from the range of check writer ratings based on the history of checks associated with the customer.

13. The method of claim 12, wherein selecting the check writer rating from the range of check writer ratings comprises selecting the lowest check writer rating when the customer has no history of checks previously tendered to the retail corporation.

14. The method of claim 12, including establishing a velocity limit for a financial transaction card to be issued to the customer approved for enrollment, wherein the velocity limit is based on the check writer rating for the customer.

15. The method of claim 14, wherein the check writer rating for the customer is based at least on a number of checks and a dollar amount of checks written by the customer to the retail corporation, with a customer having written a large number of checks for a large dollar amount to the retail corporation having a higher check writer rating than a customer having written a smaller number of checks to the retail corporation for a smaller dollar amount.

16. The method of claim 15, wherein establishing the velocity limit includes:
    establishing a range of velocity limits having a lowest velocity limit and a highest velocity limit; and
    selecting the velocity limit from the range of velocity limits based on the check writer rating of the customer.

17. A method of processing a purchase transaction for one or more items, the method comprising:
    receiving identifying information about a customer at a central computing network, wherein:
        the identifying information is received via a device processing the purchase transaction at a location of the customer,
        the central computing network includes a solicitation processor and a comprehensive negative check file,
        the comprehensive negative check file is maintained by a retail corporation and comprises an internal negative check file and an external negative check file,
        the internal negative check file includes at least a list of outstanding checks to the retail corporation that are unpaid due to non-sufficient funds, and
        the external negative check file includes a copy of a file compiled by a third party check authorization service, and
    using the solicitation processor of the central computing network to determine whether to solicit the customer to apply for a financial transaction card, wherein using the solicitation processor includes:
        determining if any of a plurality of predefined reasons exist not to solicit the customer to apply for the financial transaction card, wherein one of the plurality of predefined reasons includes if the identifying information about the customer matches information of a check listed in the comprehensive negative check file,
        if any of the plurality of predefined reasons exist, deciding not to solicit the customer to apply for the financial transaction card, and
        if none of the plurality of predefined reasons exist, deciding to solicit the customer to apply for the financial transaction card.

18. The method of claim 17, wherein the identifying information includes magnetic ink character recognition (MICR) information from a check associated with a checking account belonging to the customer.

19. The method of claim 18, wherein, if, while using the solicitation processor to determine whether to solicit the customer to apply for the financial transaction card, it is determined that the customer should be solicited to apply for the financial transaction card, the method further includes:
    soliciting the customer via the device processing the purchase transaction to apply for the financial transaction card; and
    if the customer accepts the solicitation, enrolling the customer for the financial transaction card including receiving customer instructions for funding the financial transaction card, and applying funds of the financial transaction card to pay for one or more items being purchased by the customer during the purchase transaction.

20. The method of claim 17, wherein:
    the central computing network includes an account database having a list of credit and debit accounts associated with the retail corporation,
    the plurality of predefined reasons includes the customer having an existing debit account associated with the retail corporation, and
    determining if any of the plurality of predefined reasons exists includes determining if the customer has an existing debit account associated with the retail corporation including accessing the account database.

* * * * *